Patented Aug. 19, 1930

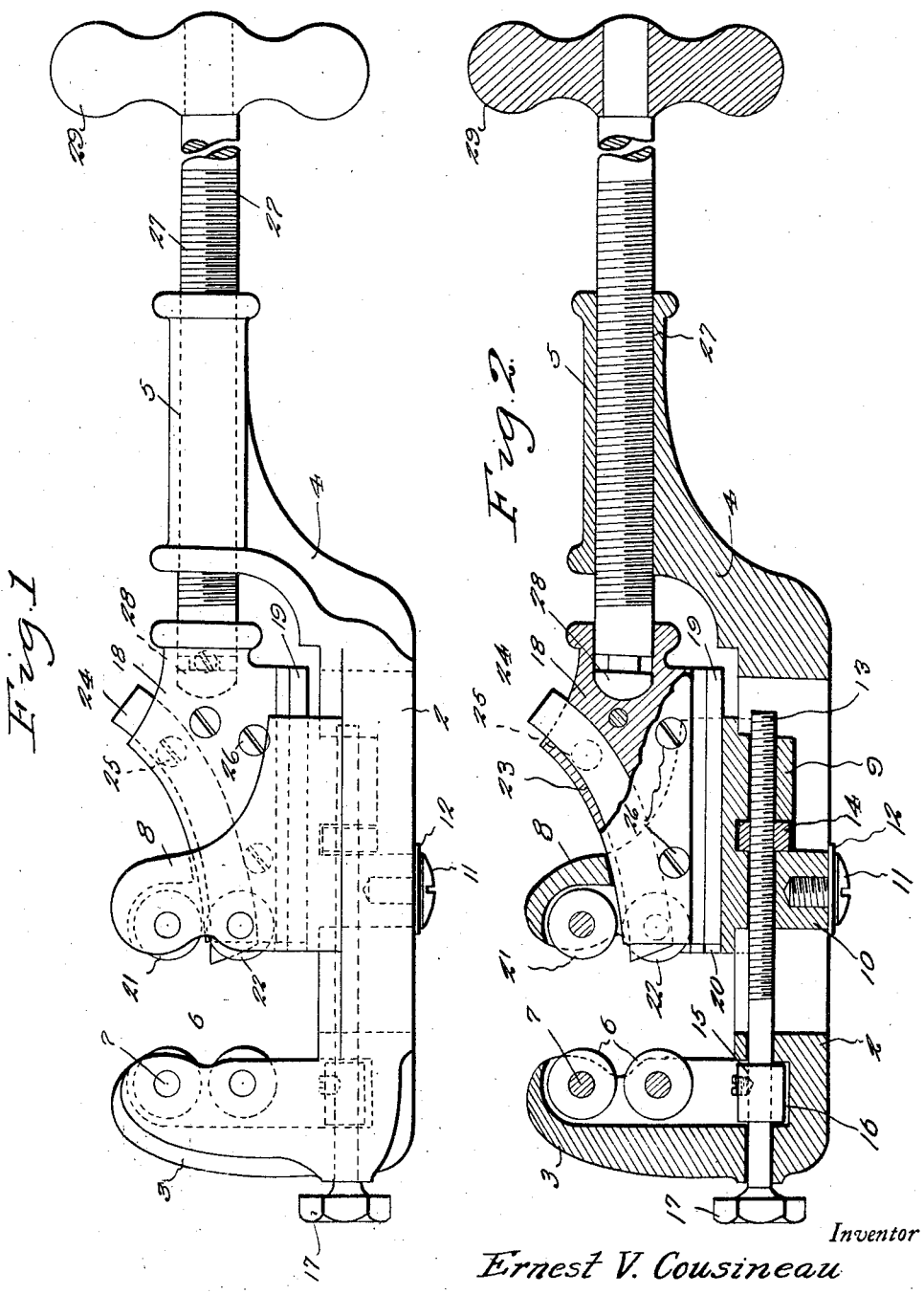

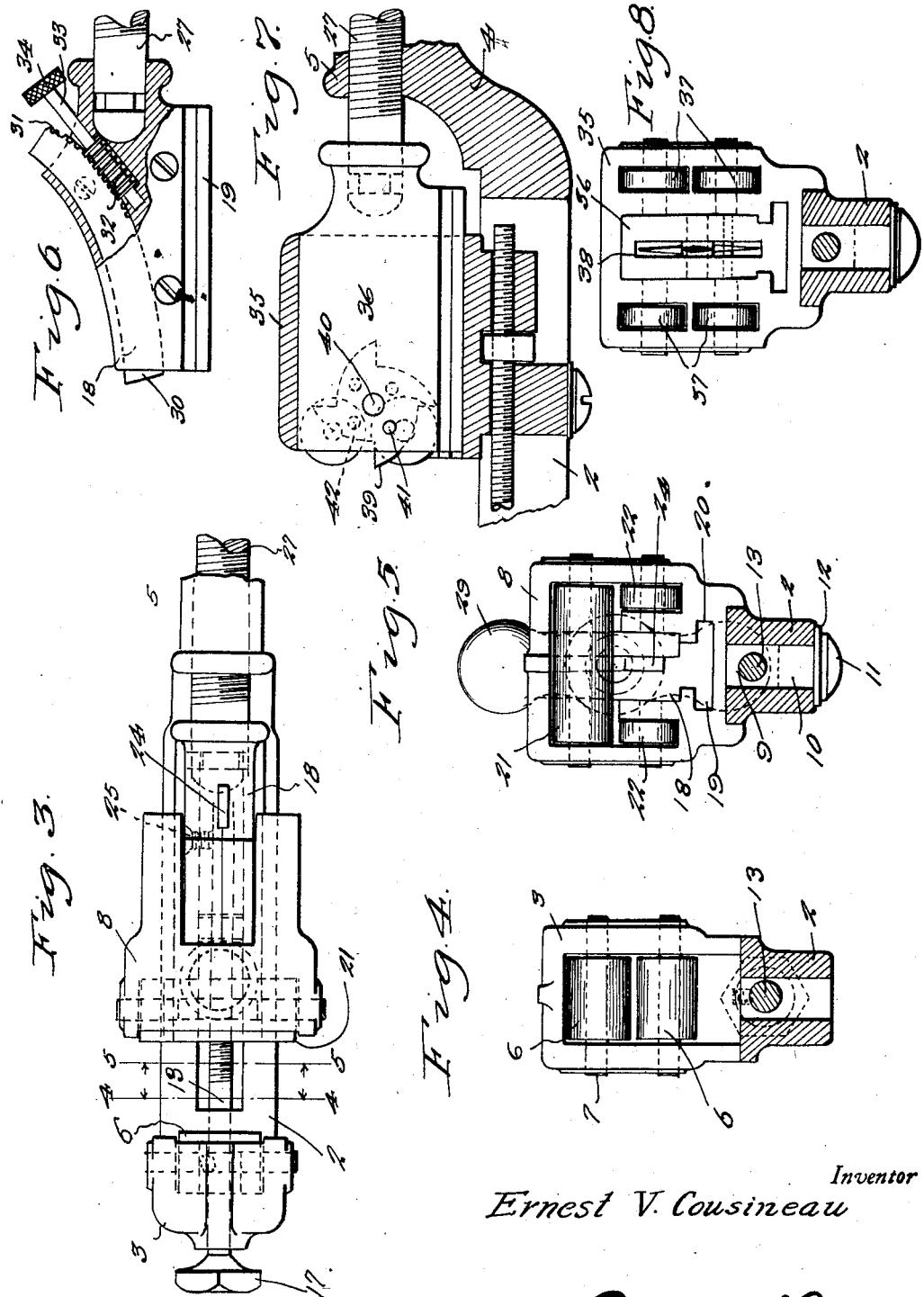

1,773,096

UNITED STATES PATENT OFFICE

ERNEST V. COUSINEAU, OF CHICOPEE, MASSACHUSETTS

PIPE CUTTER

Application filed May 9, 1928. Serial No. 276,353.

The present invention relates to improvements in tools and has reference more particularly to a pipe cutter.

One of the principal objects of the present invention is to provide a pipe cutter, wherein co-acting stationary and movable jaws are arranged on a frame, between which jaws the pipe or rod to be cut is placed, guide rollers being arranged in the inner opposed faces of the jaws for contact with the stock to be cut.

A cutter supporting carriage is slidably associated with the movable jaw and is independently adjustable with respect to the movement of said jaw.

A further object is to provide a tool of the above mentioned character which will, at all times, be positive and efficient in its operation, the same being further simple in construction, inexpensive, strong and durable, and further well adapted to the purpose for which it is designed.

Other objects of the invention will become apparent as the nature of the invention proceeds and when taken in connection with the accompanying drawings.

In the accompanying drawings, forming a part of this application and wherein like reference characters designate like parts throughout the several views:

Figure 1 is a side elevation of the pipe cutter embodying my invention.

Figure 2 is a longitudinal sectional view therethrough.

Figure 3 is a top plan view, a portion of the horizontally disposed internally threaded sleeve and the feed screw operable therethrough being broken away.

Figure 4 is a sectional view, taken approximately on the line 4—4 of Figure 3, looking in the direction of the arrows.

Figure 5 is a similar section taken on the line 5—5 of Figure 3, looking in a reverse direction.

Figure 6 is a detail of a modified cutter and the adjusting means therefor.

Figure 7 is a sectional view through the movable jaw, showing a further modification of the pipe cutter, and Figure 8 is a front elevation of the movable jaw and the cutter shown in Figure 7.

In the drawings, with reference more particularly to Figures 1 to 5 inclusive, the numeral 1 designates generally my improved pipe cutter, the same comprising an elongated horizontally disposed frame 2, that is formed at its forward end with the upwardly disposed stationary jaw, 3. A relatively short post 4 extends upwardly from the rear end of the frame 2 and formed on the upper end of this post is the horizontally disposed internally threaded sleeve 5.

The inner face of the stationary jaw 3 is cut out to accommodate the transversely disposed guide rollers 6, a pair of such rollers being provided as shown very clearly in Figures 2 and 4, and a portion of each of these rollers protrudes beyond the inner face of the jaw. The pins on which these rollers are mounted are shown at 7, and the ends of these pins are received in suitable openings formed in the respective sides of the jaw.

Cooperating with the stationary jaw 3 is the movable jaw 8 that is slidable along the upper face of the frame 2, and a tongue 9 depends from the bottom of this movable jaw for disposition between the sides of the frame 2, so that said movable jaw will be guided during its sliding movement and will furthermore be prevented from rotating.

The major portion of the tongue 9 extends only a partial distance downwardly in the frame. A lug 10 extends downwardly from the forward end of the tongue and the bottom face of this lug is disposed substantially flush with the bottom face of the frame, as shown very clearly in Figure 2. This lug is formed with an upwardly extending threaded recess for receiving a screw 11, the head of which is enlarged. A washer 12 is arranged on the screw and engages the bottom face of the sides of the frame and when the screw is tightened, the movable jaw 8 will be secured in an adjusted position.

The adjusting means for the movable jaw 8 comprises a longitudinally extending feed screw 13 that is disposed in a suitable opening formed in the forward end portion of the frame in the lower stationary jaw 3. The tongue 9 is formed with a longitudinally extending opening to receive the threaded end of the feed screw, and furthermore the tongue is formed with a transverse cut-out portion which intersects the longitudinal opening formed in the tongue, as shown in Figure 2.

A nut 14 is disposed in this cut-out portion and the bore of the nut is in registration with the opening that extends longitudinally through the tongue 9, for cooperation with the threaded end of the feed screw. The feed screw is locked against sliding movement by means of the collar 15 that is secured on the forward end portion of the feed screw and is disposed in a cavity 16, formed in the upper face of the forward end portion of the frame 2.

An actuating knob 17 is arranged on the forward end of the feed screw for turning the same, so that the jaw 8 may be adjusted with respect to the stationary jaw when the locking screw 11 is loosened.

The movable jaw 8 is formed with a cut-out portion for receiving the slidable tool carriage 18 and the lower portion of this carriage is formed with the longitudinally extending ribs 19 on its side edges, which are guided in the channels 20 formed in the inner opposed sides of the openings in the jaws 8 and this feature is shown more clearly in Figures 2 and 3. The inner face of the jaw 8 is also cut-out to receive the upper and side guide rollers 21 and 22 respectively, which project beyond the inner face of the jaw and the side rollers are arranged on opposite sides of the sliding carriage 18, as shown in Figure 5. The carriage is furthermore provided with a curved channel 23 that extends for the full length of the carriage and slidably disposed in this channel is the curved cutting blade 24, the forward end of which extends outwardly of the forward end of the carriage for disposition beyond the inner side of the movable jaw 8, for cutting engagement with the stock that is clamped between the co-acting jaws and more particularly between the opposed rollers. A set screw 25 is threaded through a transverse opening formed in one side of the carriage and the lower end of this set screw is engaged with the curved cutting blade 24, for securing the same in any adjusted position in its channel 23.

The carriage 18 is preferably constructed in complementary sections and secured together by the screws 26.

The actuating means for sliding the carriage 18 will now be specifically described. An elongated feed screw 27 is threaded through the internally threaded sleeve 5, and the inner or forward end of this feed screw is swivelly connected toward the rear end of the carriage as shown generally at 28. An actuating handle 29 is carried by the rear end of the feed screw.

In operation, the pipe or rod to be cut is placed between the stationary and movable jaws, and the movable jaw is adjusted by turning the knob 17, while the screw 11 is loose, so that the rollers arranged on the rearmost faces of the jaws will properly engage with the stock.

The set screw 11 is then tightened to lock the jaw against further sliding movement.

The feed screw handle 29 is then turned to move the carriage 18 forwardly, whereby the forward end of the cutting blade 24 will bite into the rod or bar and by manipulating the handle 29 in a vertical direction, the stock will be cut, in the manner well known in the art.

With reference now to Figure 6 of the drawings, wherein there is shown a modification of the cutter blade adjusting means, the curved cutting blade 30 is formed with the teeth 31 in the convex face thereof and at the rear end portion of the blade, and cooperating with these teeth is the worm gear 32, arranged on a spindle 33, that extends at an incline in the upper rear portion of the carriage, it being understood, of course, that a suitable cavity is formed in the carriage to accommodate a worm gear 32.

A knurled actuating knob 34 is arranged on the upper end of this spindle 33, to manually turn the spindle and when the spindle is rotated, the worm 32 will cooperate with the gear teeth 31, to move the curved blade 30 longitudinally in its channel in the carriage.

In Figures 7 and 8 of the drawings, there is shown a further modification of the cutting means and in this instance, the movable jaw that is used in lieu of the jaw 8 is denoted by the reference character 35. This jaw is operable on the frame 2, in the manner as the jaw 8 and further detailed description of the anchoring means for the jaw 35 is therefore thought unnecessary.

The jaw 35 is formed with a central cutout portion to receive the removable carriage 36, and the lower portion of this carriage is formed with longitudinal ribs on its sides, for cooperation with similar shaped channels formed in the respective sides of the central cut-out portions. A pair of guide rollers 37 are arranged in the inner face of the jaw 35, on opposite sides of the cut out portion in which the movable carriage 36 is operable, and this roller arrangement is shown very clearly in Figure 8.

The feed screw 27 is swivelly connected to the rear end of the carriage 36, and the forward end of this carriage is formed with a vertical cutout portion 38, in which is arranged a rotary cutter unit, which includes a central disc like portion and the radially extending cutting teeth 39. The hub portion of the rotary cutter is mounted on an axle 40 that extends through the sides of the forward end portion of the carriage 36, in such a manner that only one cutting tooth 39 will be exposed and extend beyond the forward end of the carriage.

For the purpose of locking the rotary cutting unit, so that one cutting tooth will be maintained in a rigid position for cutting the pipe or rod supported between the jaws, there is provided a removable locking pin 41 that extends through registering openings formed in the opposite sides of the carriage 36 and the body portion of the rotary cutter is formed at predetermined spaced intervals with openings such as are shown at 42, which are selectively brought into alignment with the locking pin 41.

It will thus be seen from the foregoing description that I have provided a tool for use in cutting pipes, bars or rods, that can be readily and easily adjusted, and when in use, the tool will at all times be positive and efficient in its operation.

A tool of this character can be manufactured at a very low cost, and will be strong and durable.

While I have shown the preferred embodiment of my invention, it is to be understood that various changes in the size, shape and arrangement of parts may be resorted to, without departing from the spirit of the invention or the scope of the appended claims.

Having thus described my invention, what I claim as new is:

1. In a tool of the character described, a frame, a stationary jaw on one end of said frame, said frame having an opening formed therein at said one end, a post extending laterally from the other end of the frame, a movable jaw slidable on said frame, said movable jaw having a tongue adapted for sliding disposition between the sides of the frame, said tongue having an opening extending therethrough, and adapted for alignment with the opening in said frame, an elongated screw extending through said aligned openings, said tongue having a recess formed therein communicating with the said opening in said tongue, a nut threaded on said screw and adapted for disposition within said recess, a carriage slidably mounted in the movable jaw, an internally threaded sleeve formed on the outer end of said post, and a feed screw threaded through said sleeve, a handle on one end of the feed screw, the other end of the feed screw being operatively connected with the carriage for adjusting the same with respect to said movable jaw, and a cutter member carried by the carriage and adapted to project beyond the inner face of the movable jaw for cutting the stock clamped between the said jaws.

2. In a tool of the character described, a frame, a stationary jaw on one end of the frame, said frame having an opening formed therein at said one end, a post extending laterally on the other end of the frame, a movable jaw slidable on said frame, said movable jaw provided with a tongue portion projecting therefrom and adapted for disposition between the side portions of the frame, said tongue having a longitudinally extending opening formed therein, said opening adapted for alignment with the opening in said frame, said frame being further provided with a recess extending transversely thereabout thereof and intersecting the opening in said tongue, an elongated screw extending through said aligned openings, a handle on the outer end of said screw, said screw provided with threads on the opposite end thereof, a nut threaded on said threaded end of the screw, said nut adapted for disposition within said recess, for moving said movable jaw toward or away from said stationary jaw, a carriage slidably mounted in the movable jaw, an internally threaded sleeve formed on the outer end of said post, a feed screw threaded through said sleeve, a handle on one end of the feed screw, the other end of the feed screw being operatively connected with the carriage for adjusting the same with respect to the movable jaw, a cutting member supported in said carriage and adapted to project beyond the inner face of the movable jaw, said cutting member being movable in the carriage and means for locking the cutting member in an adjusted position.

3. A tool of the class described, comprising a frame, a stationary jaw arranged on one end of the frame, said frame having an opening formed therein at said one end, a laterally disposed post formed on the other end of the frame, a horizontally disposed internally threaded sleeve on the outer end of said post, a movable jaw slidable on the intermediate portion of the frame, said movable jaw having a tongue portion adapted for disposition between the sides of said frame, said tongue having an opening extending therethrough, said movable jaw being further provided with a lug formed thereon adjacent one end of said tongue, said lug having an aperture formed therein and adapted for alignment with the opening in said tongue, an elongated screw extending through the opening in said frame, the opening in said lug, and the opening in said tongue, a nut threaded on the screw between said tongue and said lug, said screw having a handle formed on one end thereof, whereby this screw may be rotated within the opening for moving said movable jaw toward or away from said stationary jaw, a set screw carried by said lug and engageable with said frame for maintaining said movable jaw in an adjusted position, coacting rollers mounted on the inner opposed faces of the stationary and movable jaws, a carriage slidably mounted in the movable jaw, a cutting member supported in the carriage and adapted to project beyond the inner face of the movable jaw, a feed screw threaded through said sleeve, one end being operatively connected to the carriage, a handle on the other end of the feed screw to actuate the same and move said carriage with respect to the movable jaw.

In testimony whereof I affix my signature.

ERNEST V. COUSINEAU.